June 23, 1959   W. P. STEWART, JR   2,891,577
CONTROL DEVICE
Filed June 18, 1956   2 Sheets-Sheet 1

INVENTOR.
William P. Stewart, Jr.
BY
His Attorney

June 23, 1959 W. P. STEWART, JR 2,891,577
CONTROL DEVICE

Filed June 18, 1956 2 Sheets-Sheet 2

INVENTOR.
William P. Stewart, Jr.
BY
His Attorney

United States Patent Office 2,891,577
Patented June 23, 1959

2,891,577

CONTROL DEVICE

William P. Stewart, Jr., Dayton, Ohio, assignor to General Motors Corporation, Detroit, Mich., a corporation of Delaware Application June 18, 1956, Serial No. 592,177

5 Claims. (Cl. 137—637)

This invention relates to a control device for a fluid system and is particularly concerned with an electrically operated control device for a vehicle suspension of the air ride type.

It is, therefore, one object of this invention to provide a control device for a fluid system which comprises a valve body that includes four separate valves which control passages within the valve body. The valves are operable in pairs and the first pair of valves is normally closed while the second pair of valves normally present a restriction towards fluid flow therethrough, both sets of valves being operable to fully open position. Two separate operating means are provided, the first for operating the first pair of valves simultaneously and the second for operating the second pair of valves simultaneously and for simultaneously also operating the first pair of valves in the event that the first operating means has not become effective.

A further object of the invention is to provide the device with electrically controlled solenoid actuators which can be used as the first and second operating means.

Another object of the invention is to provide a control device of the character described wherein a valve body including a fluid passage therethrough includes two pairs of aligned valves, each pair of valves being surrounded by solenoid windings and each pair of valves being normally biased toward a closed position, said solenoid windings, when energized, causing said valves controlled thereby to operate to open position simultaneously, electrical circuitry being provided whereby the first solenoid may be energized independently of the second solenoid and the second solenoid may be energized independently of the first solenoid, however, in the event the first solenoid has not been energized, energization of the second solenoid will simultaneously cause the first solenoid to become energized.

A still further object of the invention is to provide an electrically actuated valve control which will regulate the leveling controls of a vehicular air ride suspension, the valve control being of a restrictive nature when the vehicle doors are closed and the vehicle is inoperative whereby a steady load condition is present, said valve control being fully open when the vehicle doors are open and the load is of a changing character for quickly compensating for load changes whereby a constant clearance is maintained between the axle and the chassis.

Further objects and advantages of the present invention will be apparent from the following description, reference being had to the accompanying drawings wherein preferred embodiments of the present invention are clearly shown.

Considerable interest is being shown in air ride suspension systems for vehicles. These systems include leveling mechanisms which control the level of vehicle as it is being loaded so that the vehicle body is always maintained at substantially the same clearance with respect to the axles. A system using the control device as disclosed in this application is clearly shown in copending application, Serial No. 592,152, filed concurrently herewith and assigned to the assignee of this invention.

The present control device is used to control the flow of fluid to the several air springs whereby leveling is accomplished. Briefly, operation of the device is controlled by two factors; namely, the ignition switch or comparable element and a door switch or parallelly connected door switches controlled by door position. These switches either alone or in combination control the energization of the solenoids used in the control device to open and close the several valves and accomplish the results desired.

Figure 1:
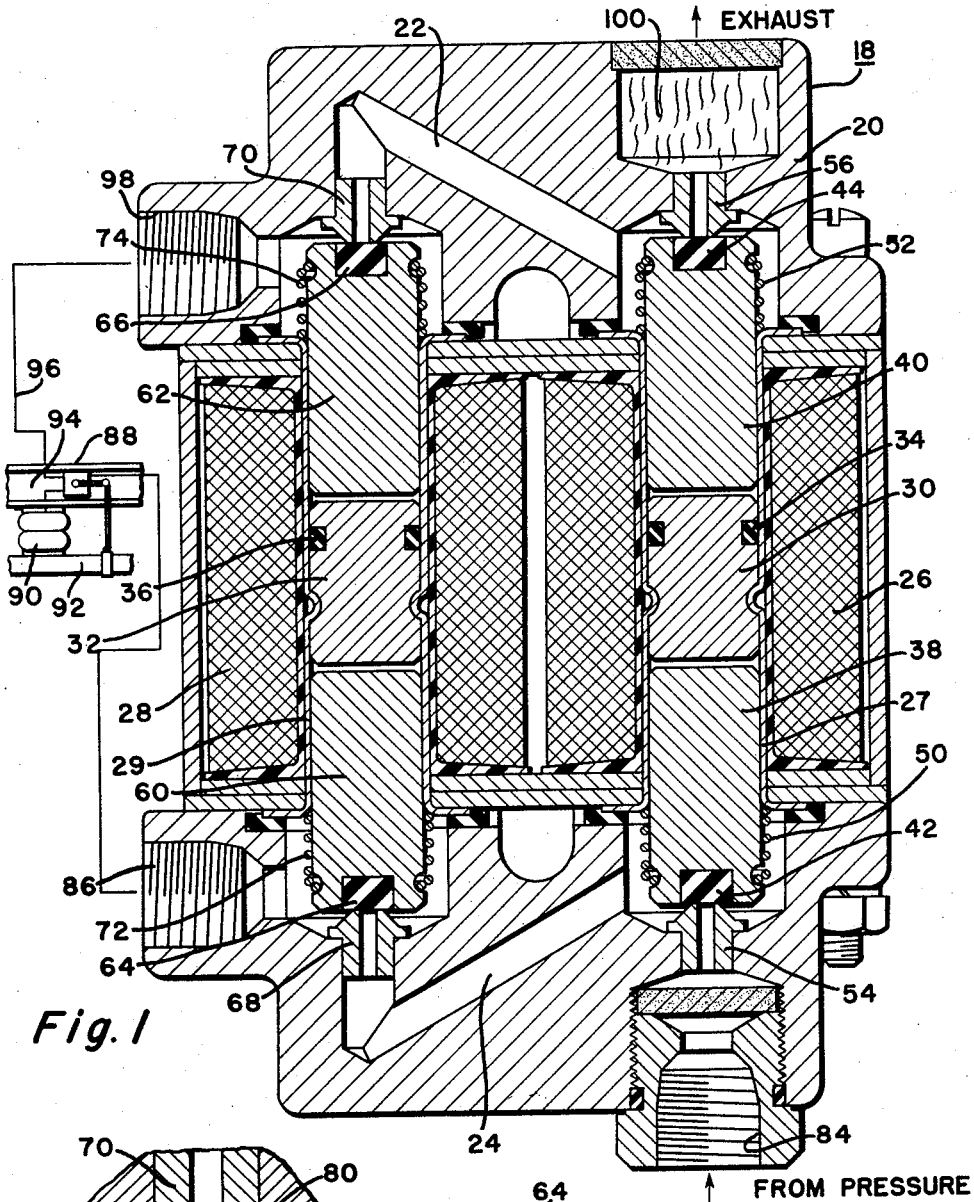
Figure 1 is a view in section taken on the line 1—1 of Figure 4 showing a preferred form of a control device.

Referring to the drawings and specifically to Figure 1, the device is shown at 18 wherein 20 is a valve body which includes a plurality of fluid flow passages 22 and 24 therein. Within the valve body are also included a pair of solenoid windings 26 and 28 which are shown in side by side relation. These windings are wound around tubular elements 27 and 29 which include fixed metal cores 30 and 32 therein which are sealed against the passage of fluid thereby by means of O seals 34 and 36. Referring specifically to solenoid 26, it may be seen that on opposite sides of the metal core 30 are disposed a pair of metal plungers 38 and 40. These plungers each include an elastomeric or other suitable insert 42 and 44 at one end thereof centrally located to act as a valve seat. The plungers 38 and 40 are each spring biased by means of springs 50 and 52 away from the core 30. The spring bias causes the plungers to move outwardly into engagement with valve seats 54 and 56, hereinafter referred to as valves, so that the valve passages are normally closed. It will be apparent therefore that when the solenoid winding 26 is energized that the two plungers 38 and 40 will be drawn inwardly thereby opening the valve passages.

Referring to the left hand side of Figure 1 and other solenoid 28, it will be seen that identical plungers 60 and 62 are provided each of which includes centrally disposed inserts 64 and 66 therein similar to inserts 42 and 44. Inserts 64 and 66 are disposed to contact valve seats 68 and 70 and are held in valve closing relation therewith by means of springs 72 and 74 which act to hold the plungers away from the central core 32.

Figure 2:
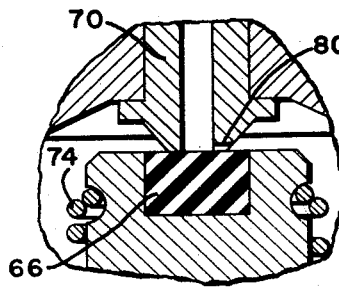
Figure 2 is an enlarged view of the bottom valve on the left hand side of Figure 1.
Figure 3:
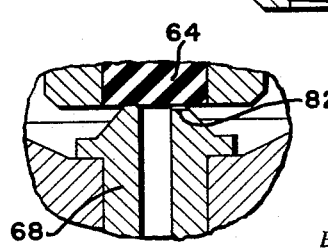
Figure 3 is an enlarged view of the top valve on the left hand side of Figure 1.
Figure 4:
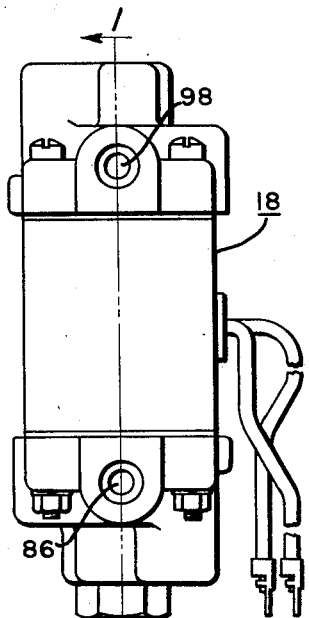
Figure 4 is a plan view of the device shown in Figure 1.
Figure 5:
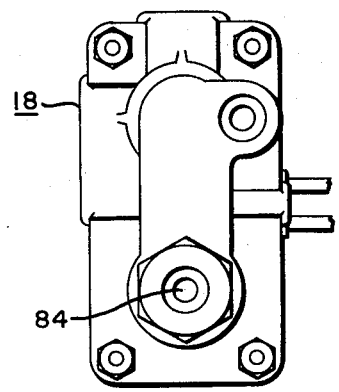
Figure 5 is a bottom view of the device shown in Figure 4.

Referring specifically to Figures 2 and 3, it will be noted that both of the valve seats 68 and 70, hereinafter referred to as valves, are of the restrictor type, that is, each valve includes a small bleed passage 80 and 82, respectively, therein which permits fluid to slowly pass the valve even when the plungers are in the position shown in Figure 1. Thus, there is a certain degree of resistance to flow of fluid through the valves although fluid may bleed slowly thereby. It is apparent that when the winding 28 is energized both plungers 60 and 62 have drawn toward the core 32 whereby the valves are fully opened.

Diagrammatic fluid connections for the control device are shown in Figure 1 wherein fluid under pressure from a reservoir (not shown) passes through an inlet 84 and filter, when the valve is open, through the valve 54, passage 24, valve 68 and outwardly from the device through an outlet 86. Outlet 86 is connected through suitable valve means shown diagrammatically at 88 to an air spring 90 which is connected between an axle 92 and a vehicle frame 94. A valve of the general type shown at 88 is described in detail in U.S. Patent 2,670,201. The exhaust from this system passes through a duct 96 into upper inlet 98 of the control device 18 whence it will pass through the valve 70, duct 22, valve 56 and will be exhausted to atmosphere through a silencer element 100 of suitable design. It is to be understood that while only one valve 88 and one air spring 90 is shown, that two to four such devices are generally used in the average vehicle.

Figure 6:
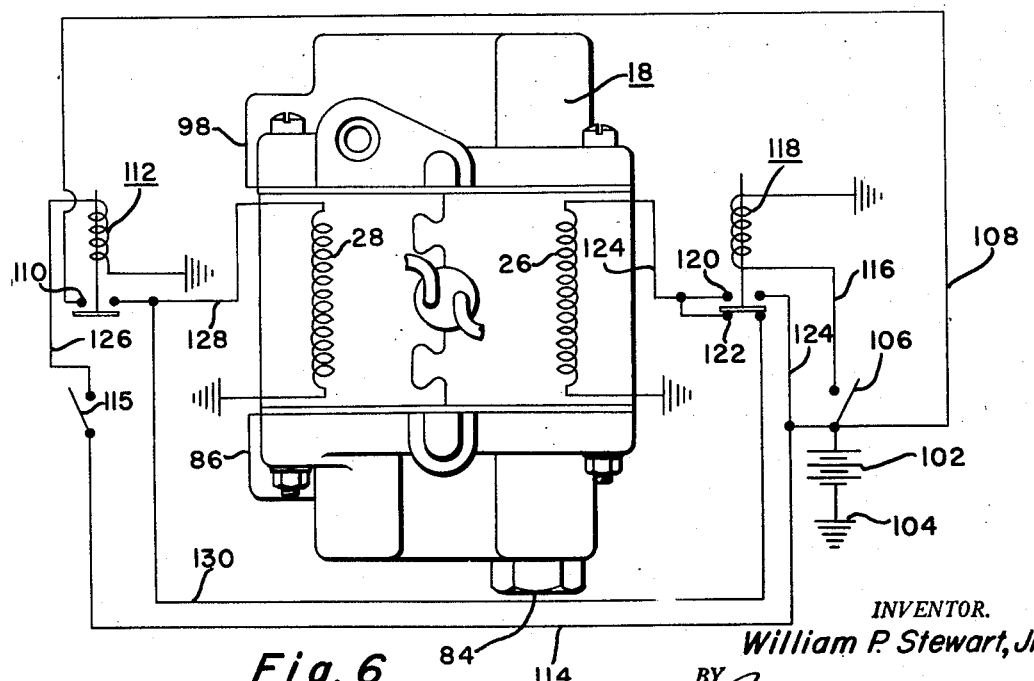
Figure 6 is a diagrammatic view showing the electrical hook-up used in connection with the control device.

A diagrammatic electrical hook-up for the device 18 is shown in Figure 6 wherein the solenoid windings 26 and 28 are shown as center tap windings having the ends grounded. Current for operation of the device is supplied by a battery 102 which has one side thereof grounded at 104 and the other side thereof connected to a normally open ignition switch 106. The battery 102 is connected by means of wire 108 to one terminal 110 of a relay 112 and is also connected by means of wire 114 to one side of a normally open door switch 115. The ignition switch 106 connects through wire 116 to a second relay 118 which includes two sets of contacts 120 and 122.

When the ignition switch 106 is closed, current passes from battery 102 through the ignition switch 106 and wire 116 to energize the relay 118 which closes the contacts 120 allowing current from the battery to flow through wire 124 to energize the solenoid 26. When this condition exists, the valves 54 and 56 are opened and fluid may pass through duct 24 and bleed past valve 68 to slowly enter the bellows or air spring 90. This causes a gradual leveling action and permits the vehicle to be brought to the proper height slowly. If, however, a door is opened, door switch 115 is closed which causes current to flow through wire 114, switch 115, wire 126 to the relay 112 to energize the same and close the contacts 110 to cause the flow of current through wire 128 to the solenoid winding 28. This energization of winding 28 causes valves 68 and 70 to be fully opened which permits rapid passage of fluid through the system so the leveling action is accomplished quickly as passengers get in or out of the vehicle.

In the event that passengers are entering the vehicle and the ignition switch is open, the fast leveling will be accomplished through a shunt circuit which is explained as follows. When the door switch 115 is closed and relay 112 is energized, current flows through wire 128 to energize solenoid winding 28. This current also passes through wire 130 to contcats 122 which are normally closed when the relay 118 is not energized. This shunt circuit energizes the solenoid 26 which opens the associated valves and permits rapid leveling as the passengers are entering or leaving the vehicle even though the ignition switch is in open position. Thus, there are three possible modes of operation of the control device, namely, when the ignition switch is closed and the doors are also closed, fluid can pass to the restrictor valves which causes slow controlled leveling; when the doors are open and the ignition switch 106 is closed, the restrictor valves are opened so that rapid leveling occurs or when the ignition switch is open and the doors are open, rapid leveling will be accomplished through a by-pass or shunt circuit.

When all doors are closed and the ignition switch is closed, the main valves are held open by the solenoid 26 while the resistance valves are closed to slowly bleed and permit gradual leveling at times when the load is more or less static.

From the foregoing, it will be apparent that I have provided a control device which is flexible in its operation and through interlocking circuitry provides for complete flexibility in operation regardless of conditions whereby the vehicle will be levelled through the control device to meet all conditions.

While the embodiments of the present invention as herein disclosed constitute preferred forms, it is to be understood that other forms might be adopted.

What is claimed is as follows:

1. A control device for a fluid system comprising in combination; a valve body including inlet and exhaust passages for fluid flow therein, each passage including two valves disposed in series arrangement in the flow path and operable in pairs comprising one valve in each passage to control the flow of fluid within said passages, the first valve in series in the flow path of said inlet passage and the last valve in series in the flow path of said outlet passage operable as a first pair of said valves, the other valves in said passages operable as a second pair of said valves, the first pair of valves in their respective passages being biased closed and simultaneously operable to open position to permit fluid flow through said passages, the second pair of valves in their respective passages being biased to permit a restricted fluid flow therethrough and being simultaneously operable to fully open position to permit full fluid flow through said passages, a first means for operating the first pair of valves and a second means for operating concurrently the first and second pair of valves, said first means being operable separately from said second means.

2. A control device for a fluid system comprising in combination; a valve body including inlet and exhaust passages for fluid flow therein, each passage including two valves disposed in series arrangement in the flow path and operable in pairs comprising one valve in each passage to control the flow of fluid within said passages, the first valve in series in the flow path of said inlet passage and the last valve in series in the flow path of said outlet passage operable as a first pair of said valves, the other valves in said passages operable as a second pair of said valves, the first pair of valves in their respective passages being biased to closed position and operable to open position to permit fluid flow through said passages, the second pair of valves in their respective passages being biased to a restricted fluid flow therethrough and operable to fully open position to permit full fluid flow through the said passages, said valves and passages being so arranged that when the first pair of valves is open full fluid flow occurs through the first pair of valves and restricted fluid flow occurs through said second pair of valves and when both pairs of valves are open free fluid flow occurs through all valves, means for operating the first pair of valves, and second means for operating the second pair of valves, said second means being connected to simultaneously operate the first pair of valves in the event the first means has not operated the first pair of valves.

3. A control device for a fluid system comprising in combination; a valve body including inlet and exhaust passages for fluid therein, two solenoid windings each surrounding a pair of movable cores carried in axial alignment within the respective winding, each core including valving means at the ends thereof opposed to its aligned core and being simultaneously operable in pairs by energization of their respective winding, said passages each having one of said valve means of each operable pair disposed in series arrangement, each valve being operated by its respective core, means for biasing all of said cores to valve closing position at which one of said pairs of valves provides for restrictive flow of fluid therethrough and the other of said pairs of valves prevents flow of fluid therethrough, control circuits interconnecting said windings through switches whereby one of said windings when energized through its control circuit upon closure of one switch will simultaneously open both valves controlled thereby and the other winding when energized through its control circuit upon closure of another switch will simultaneously open both valves controlled thereby and will also control the first winding and simultaneously open both valves controlled by the first winding in the event the first winding has not previously been energized.

4. The device as claimed in claim 1 wherein the first and second means are electrically controlled.

5. The device as claimed in claim 2 wherein the first and second means are electrically controlled.

References Cited in the file of this patent

UNITED STATES PATENTS

| | | |
|---|---|---|
| 1,083,006 | Wein | Dec. 30, 1913 |
| 1,217,899 | Barrus | Mar. 6, 1917 |
| 2,657,673 | Littlefield | Nov. 3, 1953 |
| 2,687,311 | Nallinger | Aug. 24, 1954 |